(12) United States Patent
De Mey et al.

(10) Patent No.: US 10,236,923 B2
(45) Date of Patent: Mar. 19, 2019

(54) METHOD OF PROCESSING A DIGITAL SIGNAL DERIVED FROM AN ANALOG INPUT SIGNAL OF A GNSS RECEIVER, A GNSS RECEIVER BASE BAND CIRCUIT FOR CARRYING OUT THE METHOD AND A GNSS RECEIVER

(71) Applicant: u-blox AG, Thalwil (CH)

(72) Inventors: Eric De Mey, Aeugst am Albis (CH); Andreas Thiel, Wilen b. Wollerau (CH)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 16/013,287

(22) Filed: Jun. 20, 2018

(65) Prior Publication Data

US 2018/0323814 A1    Nov. 8, 2018

Related U.S. Application Data

(63) Continuation of application No. 11/729,825, filed on Mar. 30, 2007, now Pat. No. 10,033,418.

(30) Foreign Application Priority Data

Mar. 26, 2007 (EP) .................... 07405102

(51) Int. Cl.
   *H04B 1/10*       (2006.01)
   *H04B 1/71*       (2011.01)
   *G01S 19/21*      (2010.01)

(52) U.S. Cl.
   CPC ............ *H04B 1/1036* (2013.01); *G01S 19/21* (2013.01); *H04B 1/7102* (2013.01)

(58) Field of Classification Search
   CPC ......................... H04B 1/1036; H04B 1/7102
   See application file for complete search history.

(56) References Cited

U.S. PATENT DOCUMENTS 5,268,927 A    12/1993   Dimos et al.
6,141,371 A    10/2000   Holmes et al.
               (Continued)

FOREIGN PATENT DOCUMENTS

GB    1 410 638 A    10/1975

*Primary Examiner* — Jaison Joseph
(74) *Attorney, Agent, or Firm* — Finnegan, Henderson, Farabow, Garrett & Dunner LLP

(57) ABSTRACT

For suppression of continuous wave interferers at, e.g., up to four interferer frequencies ($f_1$, $f_2$, $f_3$, $f_4$) in a GNSS receiver base band circuit a raw digital signal is, in a band stop unit (21), shifted, by a first mixer (31*a*), by the negative of the first interferer frequency ($f_1$) in the frequency domain whereupon the continuous wave interferer is suppressed by a band stop filter (30*a*), a linear phase FIR filter with a suppression band centered at zero, e.g., a filter subtracting a mean over previous subsequent signal values from the actual signal value. After further shifting of the shifted digital signal by the negative of the difference between the second interferer frequency ($f_2$) and the first interferer frequency ($f_1$) the shifted digital signal is again filtered by an identical band stop filter (30*b*) and so on. After the last filtering step the shifted digital signal is shifted back to its original position in the frequency domain to provide a filtered digital signal which corresponds to the raw digital signal with narrow interferer bands centered at the interferer frequencies ($f_1$, $f_2$, $f_3$, $f_4$) suppressed.

28 Claims, 3 Drawing Sheets

(56) References Cited

U.S. PATENT DOCUMENTS

| | | | |
|---|---|---|---|
| 6,344,871 B1 * | 2/2002 | Liu | H04B 1/68 348/21 |
| 7,428,259 B2 * | 9/2008 | Wang | G01S 19/37 342/357.77 |
| 2002/0120400 A1 * | 8/2002 | Lin | G01C 21/165 701/470 |
| 2003/0112905 A1 * | 6/2003 | Heinzl | G01S 19/21 375/350 |
| 2005/0273482 A1 * | 12/2005 | Moore | H03H 17/025 708/300 |
| 2006/0094426 A1 * | 5/2006 | Donaho | H04W 8/005 455/434 |
| 2006/0159161 A1 | 7/2006 | Murakami | |
| 2007/0153878 A1 * | 7/2007 | Filipovic | H04B 1/1036 375/147 |

* cited by examiner

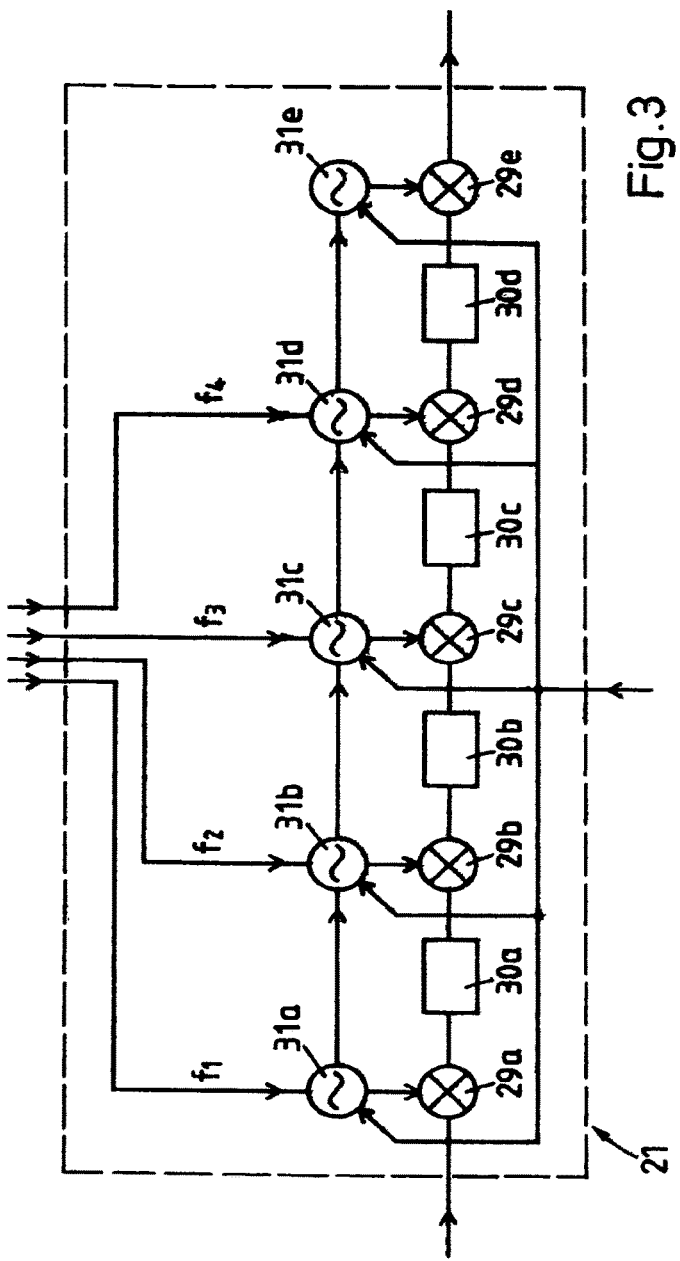
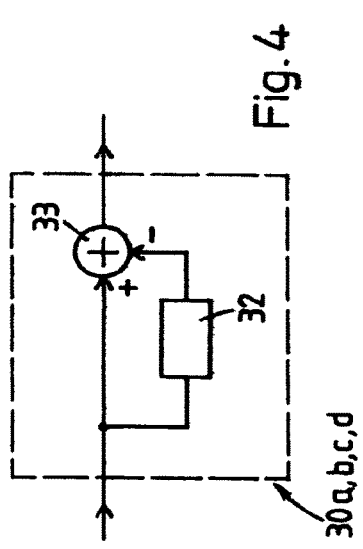

METHOD OF PROCESSING A DIGITAL SIGNAL DERIVED FROM AN ANALOG INPUT SIGNAL OF A GNSS RECEIVER, A GNSS RECEIVER BASE BAND CIRCUIT FOR CARRYING OUT THE METHOD AND A GNSS RECEIVER

This application is based upon and claims priority to U.S. application Ser. No. 11/729,825, filed on Mar. 30, 2007, which claims priority to European Application No. 07405102.0, filed on Mar. 26, 2007, the entire contents of which applications are incorporated herein by reference.

FIELD OF THE INVENTION

The invention concerns a method for processing a digital signal derived from an analog input signal of a GNSS receiver which contains signals emitted by satellites of GNSS (Global Navigation Satellite System) positioning systems like GPS, GLONASS and GALILEO in order to determine a position. The invention also concerns a base band circuit for carrying out the method and a GNSS receiver comprising such base band circuit.

PRIOR ART

It is well known in the art to suppress continuous wave interferers using so-called notch filters. Digital filters of this type can be controlled in such a way that they suppress a very narrow frequency band centered at a variable suppression frequency which is controlled according to the result of a frequency analysis of a raw, unfiltered digital signal so as to essentially coincide with the interferer frequency. The transfer function in the frequency domain has a zero at the suppression frequency and a pole close by. A system of this kind is described in US 2003/0 112 905 A1.

A notch filter of this type is an IIR filter exhibiting large variations of the group delay in the vicinity of the suppressed interferer frequency. As a consequence frequency components of the raw digital signal which belong to different parts of its frequency band are subjected to widely varying delays and the band stop filtered digital signal is considerably distorted. In a subsequent tracking step where correlations of the band stop filtered signal with sequences characteristic of individual satellites are calculated and the phases of individual satellite signals contained therein are determined this will lead to distorted and generally less pronounced correlation peaks. This may significantly reduce positioning accuracy.

SUMMARY OF THE INVENTION

It is an object of the invention to provide a method of the generic type whereby continuous wave interferers are removed from the digital input signal by band stop filters with fixed suppression frequencies. This object is achieved by the features in the characterizing portion of claim 1.

The method according to the invention provides for reliable suppression of continuous wave interferers while at the same time allowing to pursue additional goals like avoidance of distortions of the digital signal in the band stop filtering step which might compromise positioning accuracy. The method can be carried out in ways which require only very moderate processing capacity for the band stop filtering step. As a consequence, the band stop filtering unit contributes only minimally to hardware complexity and expenses related thereto.

It is a further object of the invention to provide a base band circuit for carrying out the method and a GNSS receiver comprising such base band circuit. The base band circuit and GNSS receiver according to the invention are relatively simple and easy to produce while at the same time offering high positioning accuracy and robustness against jamming signals.

BRIEF DESCRIPTION OF THE DRAWINGS

In the following the invention is described in more detail with reference to drawings showing an embodiment of the invention where FIG. 3 shows a band stop unit of the base band circuit of FIG. 2 and FIG. 4 shows a band stop filter of the band stop unit of FIG. 3.

DESCRIPTION OF THE PREFERRED EMBODIMENTS

Figure 1:
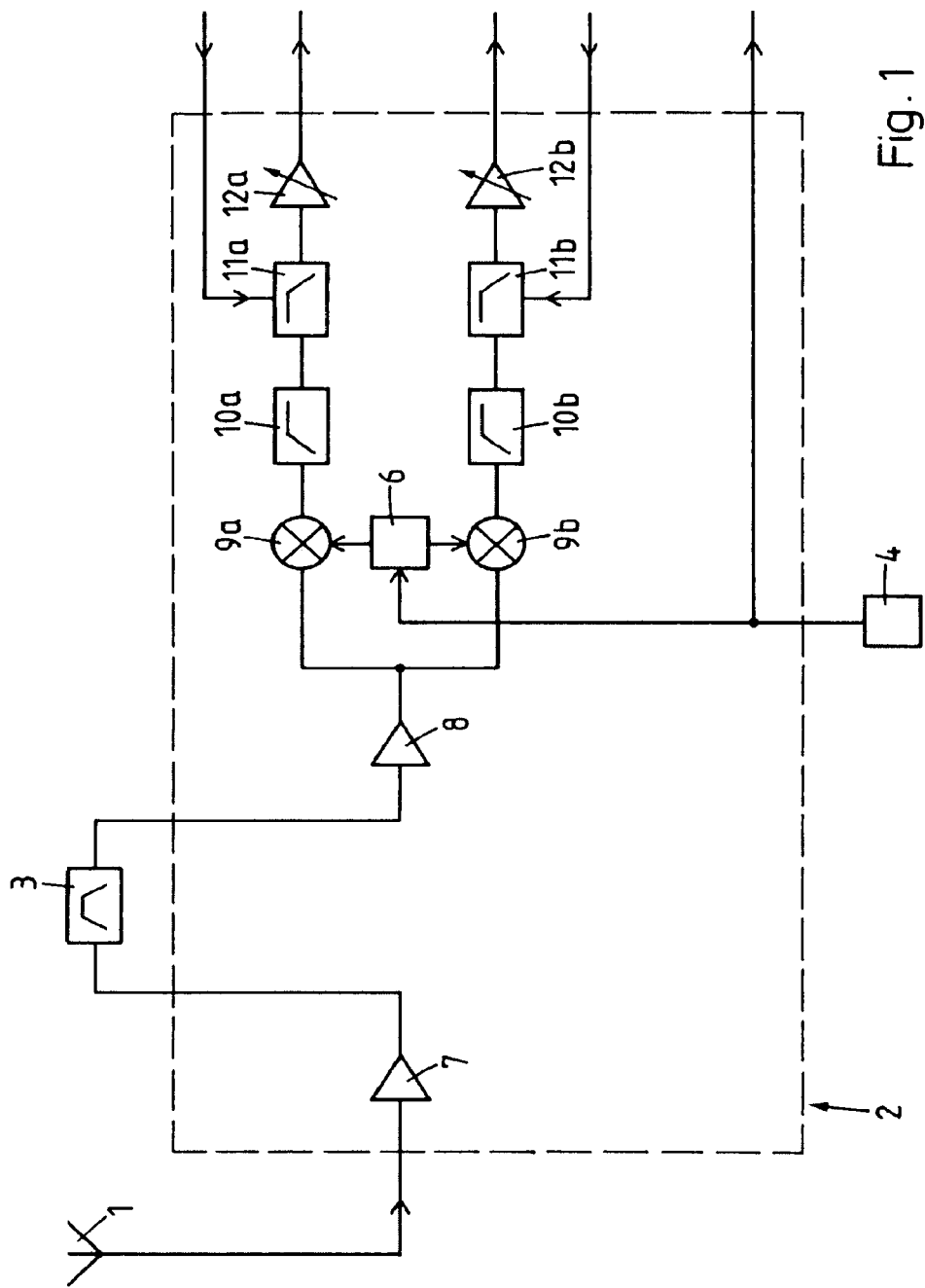
FIG. 1 shows a radio frequency circuit of a GNSS receiver according to the invention.
Figure 2:
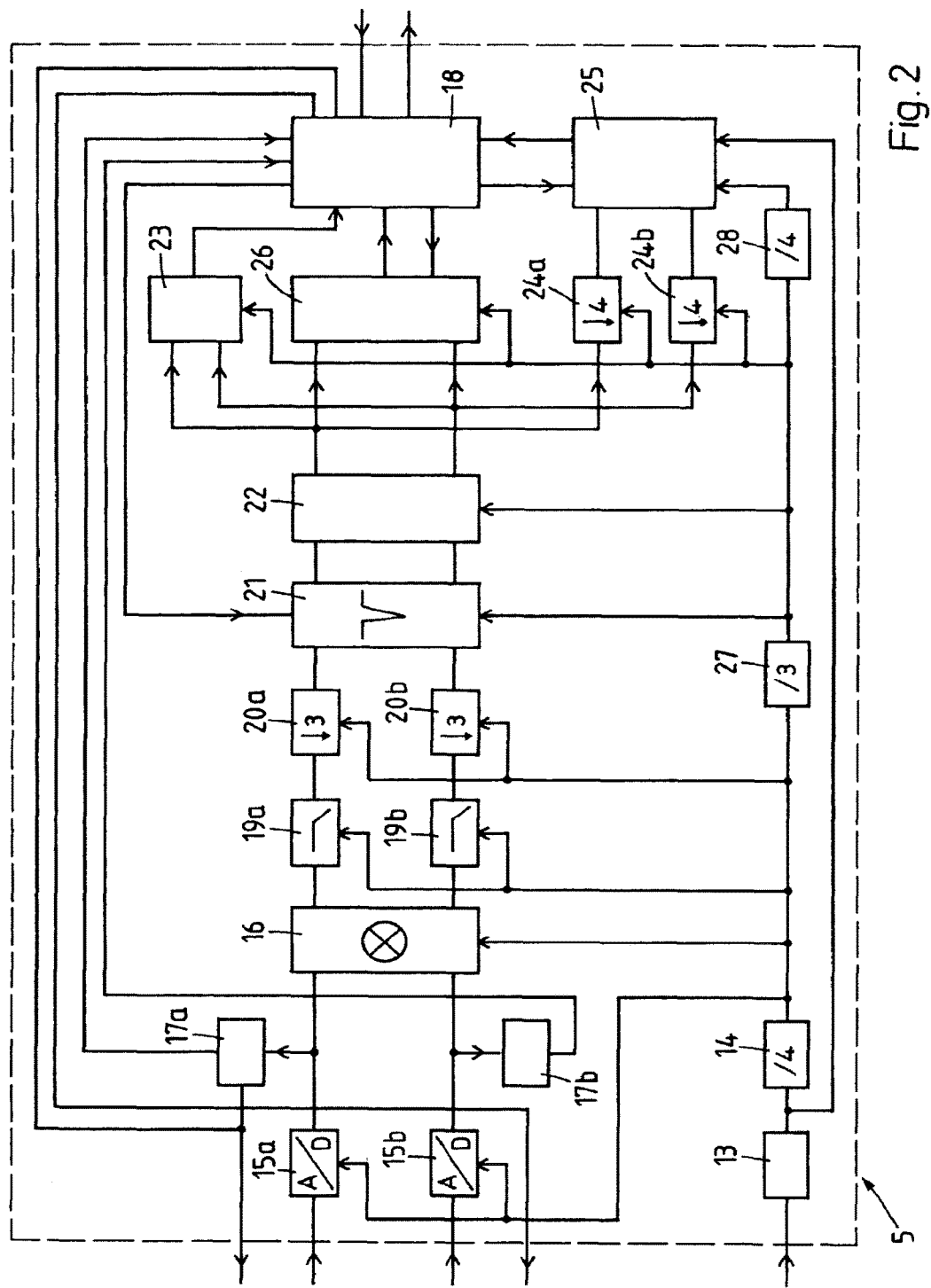
FIG. 2 shows a base band circuit of a GNSS receiver according to the invention.

The embodiment described in the following is a receiver suitable for GPS. However, the modifications which are necessary if other systems like GALILEO or GLONASS are to be used are straightforward. The receiver comprises (FIG. 1) an antenna 1 followed by a radio frequency circuit 2, a bandpass filter 3, a TCXO (temperature compensated crystal oscillator) 4 and (FIG. 2) a base band circuit 5. It is advantageous to implement the radio frequency circuit 2 and the base band circuit 5 each on a separate semiconductor chip but other solutions are also possible.

The bandpass filter 3, usually an SAW (surface acoustic wave) filter, is a component external to the radio frequency circuit 2. The TCXO 4, also a separate component, provides a basic frequency of between 19 MHz and 40 MHz, e.g., 26 MHz, which is fed to the radio frequency circuit 2 and further to the base band circuit 5. In the radio frequency circuit 2 the output signal of TCXO 4 controls a PLL unit 6 which produces a 3,158 MHz clock signal from which two further clock signals with half the clock rate, i.e., 1,579 MHz, are derived with one of the clock signals phase-shifted by 90° with respect to the other.

The antenna input of the radio frequency circuit 2 is followed by a low noise amplifier 7 which is connected, via the external band pass filter 3 and a controllable RF amplifier 8, to mixers 9a,b which also receive the clock signals from PLL unit 6. Together they form a complex mixer which provides an I and Q component of a complex analog signal shifted down to an intermediate frequency of approximately 3 MHz. They are each followed by a high pass filter 10a; b with a cutoff frequency of about 20 kHz and a controllable low pass filter 11a; b with a cutoff frequency of around 7.5 MHz connected to the output of the radio frequency circuit 2 via programmable gain amplifiers 12a; b.

The output of radio frequency circuit 2 is connected to an input of the base band circuit 5. The output signal of TCXO 4 is, via radio frequency circuit 2, also fed to the base band circuit 5 where it controls a PLL unit 13 producing a clock signal with a clock rate of 96 MHz which is reduced to 24 MHz by a subsequent frequency divider 14. Directly at the input of the base band circuit 5 A/D converters 15a,b with 5 bit resolutions are provided for sampling the input signal with a sampling rate of 24 MHz, producing a complex digital signal which is fed to a complex digital mixer 16 that reduces it to base band and to frequency analyzers 17a,b whose outputs are connected to a control unit 18 which controls low pass filters 11a,b in radio frequency circuit 2. The mixer 16 is followed by decimation filters 19a,b, each with a cut-off frequency of 3 MHz, and down-samplers 20a; b. A/D converters 15a,b, mixer 16, frequency analyzers 17a,b, decimation filters 19a,b and down-samplers 20a,b are controlled by the clock signal from frequency divider 14.

A band stop unit 21 for filtering a raw digital signal by removing continuous wave signals and a decimator 22 for reducing the filtered digital signal from 6 to 3 bits are followed by a frequency analyzer 23 whose output signal is used by control unit 18 to control the band stop unit 21 and, via down-samplers 24a,b, by an acquisition unit 25 for identifying components of the signal as emitted by specific satellites of the GNSS system as well as by a tracking unit 26 for continually tracking the said signal components and analyzing their time delays and for extracting data bits from them.

A frequency divider 27 produces, from the 24 MHz signal output of frequency divider 14, a 8 MHz clock signal which controls band stop unit 21, decimator 22, frequency analyzer 23, down-samplers 24a,b and tracking unit 26. A further frequency divider 28 provides a 2 MHz clock signal for the acquisition unit 25 which also receives the 96 MHz clock signal from PLL unit 13. The control unit 18 receives data from the tracking unit 25 which, apart from the time delays of signals emitted by the individual satellites, comprise almanac and ephemeris data extracted from the said signals. From those data the control unit 18 calculates the position of the GNSS receiver. The calculations which may also involve additional data stored in the receiver or transmitted to it via some additional link are carried out in ways well known in the art. The control unit 18 also controls the acquisition unit 25 and the tracking unit 26.

After the analog signal received by the antenna 1 (FIG. 1) has been amplified by low noise amplifier 7 its spectrum is reduced to a 30 MHz band centered at the GPS frequency of 1'575.42 MHz by band pass filter 3. After further amplification and mixing any DC component is removed by high pass filters 10a,b and high frequencies are suppressed by low pass filters 11a,b for anti-aliasing. The low pass filters 11a,b are controlled by the control unit 18 (FIG. 2) based on the outputs of frequency analyzers 17a; b in such a way that the signal is, with respect to the signal at a reference frequency of 3 MHz, attenuated by not more than −3 dB at 7.5 MHz and by at least −12 dB at 12 MHz, i.e., at half the sampling rate of A/D converters 15a,b at the input of base band circuit 5. The programmable gain amplifiers 12a,b adjust the signal to the input range of the A/D converters 15a,b.

The amplified and filtered complex analog signal is then converted to a complex digital signal by A/D converters 15a,b of base band circuit 5 and then derotated, i.e., shifted essentially to zero by complex digital mixer 16. After its spectrum has been reduced to a 3 MHz frequency band by decimation filters 19a,b, its sampling rate is reduced to 8 MHz by down-samplers 20a; b. This raw digital signal which is restricted to a fixed raw signal frequency band extending from −3 MHz to +3 MHz is then fed to band stop unit 21 for filtering. Several continuous wave interferers can be suppressed with only negligible distortion of the raw digital signal to produce a filtered digital signal restricted to a filtered signal frequency band which coincides with the raw signal frequency band as will be explained in more detail below. In a next step the filtered digital signal is requantized from 6 bits to 3 bits in the decimator 22 which uses a non-linear decimation table. The resulting digital signal is then fed in parallel to frequency analyzer 23, tracking unit 26 and, via down-samplers 24a,b which reduce the sample frequency to 2 MHz, to acquisition unit 25.

In the acquisition unit 25 a signal derived from this input signal is correlated with internally produced characteristic sequences of GNSS satellites at various Doppler frequencies and with various phase shifts. The relatively low 2 MHz sample frequency allows efficient processing of the signal and, as a consequence, fast lock-on to received satellite signals.

On the other hand, in the tracking unit 26, where the same sequences, frequencies and phase shifts are applied as have yielded high correlation values in the acquisition unit 25, the higher sample frequency of 8 MHz allows for a very precise determination of the positions of the correlation peaks and associated phases of the said satellite signals which in turn allows a precise calculation of receiver position. The results from frequency analyzer 23 which may be a part of the tracking circuit 26 using channels with varying scanning frequencies and constant sequences, are employed for the detection of any continuous wave interferers and determination of their interferer frequencies which are then used by the control unit 18 for controlling band stop unit 21 in such a way that the interferer frequencies are suppressed. The interferer frequencies can be identified by cyclical sweeping through the raw signal frequency band in steps of, e.g., 1 kHz and comparing the individual energy densities with a mean over the entire frequency band.

In the following, band stop unit 21 is explained in more detail with reference to FIG. 3. It comprises a series of several—in the example five—complex digital mixers 29a, b,c,d,e. With the exception of a last mixer 29e each of them is followed by a complex digital band stop filter 30a; b; c; d. Each of the mixers 29a,b,c,d,e is directly controlled by a numerically controlled oscillator 31a; b; c; d; e locked to the 8 MHz clock signal from frequency divider 27. Mixer 29a, band stop filter 30a and oscillator 31a form a band stop subunit suitable for suppressing a single continuous wave interferer. The same applies to mixers 29b,c,d, band stop filters 30b; c; d and oscillators 31b; c; d. The band stop filters 30a,b,c,d are preferably equal, conforming to a band stop filter which exhibits at any time high attenuation in a suppression band centered at a fixed suppression frequency—normally but not necessarily zero—while the frequency response is essentially constant over the relevant frequency band outside the suppression band. The mixers 29a,b,c,d,e are also equal.

The mixers 29a,b,c,d are controlled by oscillators 31a; b; c; d in such a way that each of them provides a shifted digital signal to the subsequent band stop filter 30a; b; c; d.

Oscillators 31a,b,c,d are each controlled by control unit 18 via a frequency input line delivering a frequency signal while oscillators 31b,c,d,e each receive a phase signal from the previous oscillator 31a; b; c; d.

It has been found to be advantageous if time-shifts between contributions of different frequency components of the raw digital signal which are fed to the band stop unit 21 to the filtered digital signal at the unit's output, do not differ, at least not by more than half a sampling interval. If this condition is not fulfilled, the filtered digital signal will be distorted. As a consequence, the correlation results derived in the following tracking step will be distorted, in turn, and the correlation peaks generally less pronounced. This may lead to a misreading of the correlation signals and introduce relatively large errors into the determination of the phases of the satellite signals which will be reflected in a decrease of positioning accuracy.

If the band stop filter is time invariant a transfer function can be defined with a frequency response and a phase response and the above condition can be reformulated as a condition on the group delay, i.e., the negative of the derivative of the phase response. The group delay ought to not vary by more than half the length of the sampling interval, i.e., in the present case, where the sampling frequency is 8 MHz, by not more than 67.5 ns.

This condition is, of course, always fulfilled if the group delay is constant, i.e., if the phase response is linear. As is well known in the art, this is the case with linear phase FIR filters. A suitable example of a band stop filter of this type which suppresses a stop band centered at zero is a filter which subtracts a gliding mean from the signal in the time domain, i.e., where the value of the output signal as a function of time t is $$y(n)=x(n)-1/M x[x(n-k_0)+x((n-1)-k_0)+ \ldots +x((n-M+1)-k_0)] \quad (1)$$

for $nT \leq t < (n+1)T$ with T the length of the sample interval and $x(k)$ the value of the input signal at time t for $kT \leq t < (k+1)T$. M can be any positive integer, preferably between 250 and 70,000, e.g., 2,046. It may also vary depending on the desired width of the suppression band. $k_0 \geq 0$ signifies a delay of the gliding mean with respect to the input signal by $k_0 T$.

The fact that the calculation of the gliding mean requires relatively high processing and memory capacity precludes its application in many cases. However, calculation of the gliding mean can be replaced by an integrate and dump process where the term subtracted from the actual value of the input signal is a mean taken over a series of subsequent values of the input signal which has a fixed length M, which mean is replaced after a period of length MT, i.e., $$y(n)=x(n)-1/M x[x(lM-k_0)+x(lM-k_0-1)+ \ldots +x((l-1)M-k_0+1)] \text{ with } l \text{ such that } lM \leq n < (l+1)M \quad (2)$$

again with $k_0 \geq 0$. Preferably, $k_0$ is equal to zero or to a small positive integer.

This band stop filter is not time invariant but can be seen as a collection of M different time invariant filters which are applied in turn, depending on the value of n mod M. Each of those filters subtracts a gliding mean delayed by (n mod M)+$k_0$ from the signal. The filter therefore approximates a band stop filter according to (1) whereas its requirements concerning processing and memory capacity are far smaller.

Each of the band stop filters 30 a,b,c,d comprises (FIG. 4) a processing unit 32 which calculates a processed digital signal from the shifted digital signal at its input. In the example the processed digital signal is a mean produced by adding up the values of M subsequent samples of the shifted digital signal and dividing the sum by M, which is then stored and output by the processing unit 32 until a new mean of the next M values of samples has been calculated by which it is replaced. In an adder 33 the value of the actual sample of the processed digital signal, i.e., the actually stored mean, is subtracted from the value of the actual sample of the shifted digital signal, x(n). So each of the band stop filters 30 a,b,c,d carries out the process according to (2), suppressing a narrow suppression band in the shifted digital signal which is centered at zero frequency. The suppression is effected in such a way that the delay of frequency components in the relevant frequency band varies only negligibly as a function of the frequency.

The function of the band stop unit 21 as a whole is explained in the following. If, e.g., three continuous wave interferers at interferer frequencies $f_1 < f_2 < f_3$ have been detected the first interferer frequency $f_1$ is fed to the first oscillator 31a which produces a phase signal $-f_1 t$ (mod 1) from which a complex exponential $e^{2\pi j f_1 t}$ is then derived and fed to mixer 29a which accordingly shifts the raw digital signal at the input of the band stop unit 21 in the frequency domain by $-f1$. After that, band stop filter 30a suppresses a fixed frequency component of the shifted digital signal, namely a suppression band centered at a suppression frequency which is equal to zero, i.e., situated at frequency $f_1$ in relation to the raw digital signal fed to band stop unit 21.

In an essentially analogous manner oscillator 31b, controlled by the frequency signal on the frequency input line and the phase signal from oscillator 31a, produces a phase signal $-f_2 t$ from which the phase signal $-f_1 t$ from oscillator 31a is subtracted. This results in a phase difference signal $(f_1-f_2)t$ from which complex exponential $e^{2\pi j (f_2-f_1)t}$ is derived and fed to mixer 29b. The latter therefore shifts the shifted digital signal further in the frequency domain by $f_1-f_2$, that is, by $-f_2$ in relation to the input signal of band stop unit 21. Again, band stop filter 30b acts on the signal in the same manner as previous band stop filter 30a, suppressing a narrow suppression band centered at zero frequency, corresponding to frequency $f_2$ in the raw digital signal at the input of band stop unit 21.

In exactly the same manner, oscillator 31c produces a phase signal $-f_3 t$, a phase difference signal $(f_2-f_3)t$ and a complex exponential $e^{2\pi j (f_3-f_2)t}$ which is fed to mixer 29c which further shifts the shifted digital signal by $f_2-f_3$ such that it is now in total shifted by $-f_3$ in the frequency domain with respect to the raw digital signal. Having been filtered by band stop filter 30c it reaches mixer 29d and band stop filter 30d. As there are at the moment only three interfering signals which need to be suppressed band stop filter 30d is inactive and $f_4 = 0$. Oscillator 31d accordingly produces a phase signal of zero and a phase difference signal of $f_3 t$ from which a complex exponential $e^{-2\pi j f_3 t}$ is derived. Mixer 31d therefore shifts the shifted digital signal by $-f_3$, that is, to a filtered signal frequency band which coincides with the raw signal frequency band, i.e., the shifted digital signal is shifted back to its original position in the frequency domain, but with narrow interferer bands centered at the interferer frequencies $f_1$, $f_2$ and $f_3$ of the continuous wave interferers suppressed.

The last oscillator 31e does not produce a phase signal of its own but only receives the phase signal from previous oscillator 31d, inverts it and then derives a complex exponential in the same way as the previous oscillators 31b,c,d, i.e., the effect is the same as when the previous oscillators 31b,c,d receive a frequency signal indicating $f=0$ from control unit 18. As in the present case it has been assumed that $f_4=0$ the frequency difference is also zero and the complex exponential equals one, i.e., mixer 29e is inactive. However, if $f_4 \neq 0$ then oscillator 31d operates exactly like oscillators 31b,c, producing a phase signal $-f_4 t$, a phase difference signal $(f_3-f_4)t$ and a complex exponential $e^{2\pi j (f_4-f_3)t}$. Oscillator 31e then receives a phase signal $-f_4 t$ from oscillator 31d, inverts it to $f_4 t$ and produces a complex exponential $e^{-2\pi j f_4 t}$ which shifts the digital signal to the filtered signal frequency band, that is, in the present example, to its original position in the frequency domain.

In the example, the band stop filters 30a,b,c,d are equal, with suppression frequencies equal to zero. Moreover, they are fixed, i.e., time independent, if not on the scale of the sampling interval T as, e.g., a gliding mean according to (1) would be, then at least on the coarser time scale given by the multiple MT of the sampling interval T. As the frequency band is shifted in such a way that each of the interferer frequencies of the shifted digital signal coincides with the suppression frequency in one of the band stop filters 30a, b,c,d it is, in particular, unnecessary to keep the suppression frequency variable. This allows for implementation of the filter in a very simple and efficient way and for pursuing other advantages. In particular, it is comparatively easy to achieve very low limits on the variability of group delay or to practically exclude such variability altogether, using a linear phase FIR filter or, as in the example, a collection of such filters which are employed in turn.

Many deviations from the example given are, however, possible within the scope of the invention. For instance, the properties of the filters may differ, in particular, their suppression frequencies may be non-zero and different from each other. Although FIR filters are preferred, other filters may be used if the variability of the group delay outside the suppression band is sufficiently small. Whereas it is convenient to suppress continuous wave interferers in the order of their ascending frequencies, it is equally possible to suppress them in the order of descending frequencies or in some entirely different order, e.g., according to decreasing strength.

It is, of course, also possible to change the filter characteristics in time, e.g., in order to adapt them to the specific conditions under which the receiver is operating.

LIST OF REFERENCE SYMBOLS 1 antenna
2 radio frequency circuit
3 band pass filter
4 TCXO
5 base band circuit
6 PLL unit
7 low noise amplifier
8 controllable RF amplifier
9a,b mixers
10a,b high pass filters
11a,b low pass filters
12a,b variable gain amplifiers
13 PLL unit
14 frequency divider
15a,b A/D converters
16 complex mixer
17a,b frequency analyzers
18 control unit
19a,b decimation filters
20a,b down-samplers
21 band stop unit
22 decimator
23 frequency analyzer
24a,b down-samplers
25 acquisition unit
26 tracking unit
27 frequency divider
28 frequency divider
29a-d mixers
30a-d band stop filters
31a-e numerically controlled oscillators
32 processing unit
33 adder
$f_1$, $f_2$, $f_3$, $f_4$ interferer frequencies

The invention claimed is:

1. A GNSS receiver baseband circuit for processing a raw digital signal which is restricted to a fixed raw signal frequency band, the receiver base band circuit comprising:

an analyzing unit configured to analyze the raw digital signal to identify a plurality of interferer frequencies, each associated with a respective interferer, within the raw signal frequency band;
a band stop unit configured to filter the raw digital signal, the band stop unit including a plurality of separate band stop subunits connected in series, each of the plurality of band stop subunits being configured to suppress a respective interferer and including:
a single mixer;
a single numerically controlled oscillator; and
a single band stop filter, wherein the single numerically controlled oscillator is configured to control the single mixer, and the single band stop filter is coupled to the single mixer and configured to suppress the respective interferer within a suppression band containing a fixed suppression frequency, and wherein:
a first one of the plurality of band stop subunits is configured to shift the raw digital signal from the raw signal frequency band by a difference between the fixed suppression frequency and a first interferer frequency before the suppression of the respective interferer, within the respective suppression band of the band stop unit,
each of the plurality of band stop subunits following the first band stop subunit is configured, in response to a phase signal from the preceding band stop subunit and an interferer frequency associated with the respective interferer suppressed by the respective band stop subunit, to further shift the shifted digital signal before the suppression of the respective interferer, within the suppression band of the respective band stop subunit, wherein the phase signal is received by the numerically controlled oscillator of the respective band stop subunit, and
the band stop unit includes a further mixer that is configured to further shift the shifted digital signal to a fixed filtered frequency band for providing a filtered digital signal restricted to the filtered frequency band after suppression of a last interferer.

2. The GNSS receiver baseband circuit of claim 1, wherein for each of the plurality of band stop subunits, the respective suppression band, suppressed by the respective band stop subunit, is based on a shifted interferer frequency associated with the respective band stop subunit.

3. The GNSS receiver baseband circuit of claim 1, wherein the band stop subunits are configured to shift in the frequency domain the digital signal in a same direction.

4. The GNSS receiver baseband circuit of claim 1, wherein the first band stop subunit shifts the raw digital signal without a shift through DC.

5. The GNSS receiver baseband circuit of claim 1, wherein the single mixer of the first band stop subunit is configured to shift the raw digital signal by multiplying the raw digital signal by a complex signal, received from the respective single numerically controlled oscillator, that is based on the first interferer frequency.

6. The GNSS receiver baseband circuit of claim 5, wherein the numerically controlled oscillator of the first band stop subunit generates the complex signal based on the first interferer frequency, and outputs the complex signal as a complex exponential signal.

7. The GNSS receiver baseband circuit of claim 1, wherein the suppression band of each band stop subunit is centered at zero frequency.

8. The GNSS receiver baseband circuit of claim 7, wherein the fixed suppression frequency of each band stop subunit is substantially zero.

9. The GNSS receiver baseband circuit of claim 1, wherein the phase signal from the preceding band stop subunit is based on the interferer frequency of the interferer suppressed by the preceding band stop subunit, such that the respective following band stop subunit is configured to further shift in the frequency domain the shifted digital signal in response to a difference between the interferer frequency of the interferer suppressed by the respective following band stop subunit and the interferer frequency of the interferer suppressed by the preceding band stop subunit.

10. The GNSS receiver baseband circuit of claim 9, wherein the difference is used to derive a phase difference signal.

11. The GNSS receiver baseband circuit of claim 10, wherein the phase difference signal is used to derive a complex exponential signal reflecting a phase difference.

12. The GNSS receiver baseband circuit of claim 1, wherein each of the following band stop subunits is configured to further shift the shifted digital signal without a shift through DC.

13. The GNSS receiver baseband circuit of claim 1, wherein the single mixer of at least one of the following band stop subunits is configured to further shift the shifted digital signal by multiplying the shifted digital signal by a respective complex signal, received from the single numerically controlled oscillator of the respective band stop subunit, wherein the complex signal is based on the difference between the interferer frequency of the interferer suppressed by the respective band stop subunit and the interferer frequency of the interferer suppressed by the immediately preceding band stop subunit.

14. The GNSS receiver baseband circuit of claim 13, wherein for at least one of the following band stop subunits, the numerically controlled oscillator generates the complex signal based on a phase signal associated with the interferer frequency of the interferer suppressed by the respective band stop subunit, wherein the complex signal is output as a complex exponential signal.

15. The GNSS receiver baseband circuit of claim 14, wherein the complex signal is derived from a phase difference signal.

16. The GNSS receiver baseband circuit of claim 15, wherein the complex signal is a complex exponential signal reflecting a phase difference.

17. The GNSS receiver baseband circuit of claim 1, wherein the single band stop filter included in each band stop subunit further includes:
a processing unit that calculates, from the shifted digital signal, a mean of a series of values of the shifted digital signal that precede the current value; and
an adder that subtracts the calculated mean from the current value of the shifted digital signal.

18. The GNSS receiver baseband circuit of claim 1, wherein for at least one of the following band stop subunits, the suppression band is suppressed such that, at least outside the suppression band, delays of different frequency components of the shifted digital signal do not differ by more than half a sampling interval of the raw digital signal.

19. A GNSS receiver baseband circuit for processing a raw complex digital signal which is restricted to a fixed raw signal frequency band, comprising:
an analyzing unit configured to analyze the raw complex digital signal to identify any continuous wave interferers within the raw signal frequency band;
a band stop unit configured to filter the raw digital signal, the band stop unit including a plurality of band stop subunits as separate band stop subunits connected in series, each of the plurality of band stop subunits being configured to suppress a single continuous wave interferer identified by the analyzing unit and including:
a single complex mixer;
a single numerically controlled oscillator; and
a single band stop filter,
wherein the single numerically controlled oscillator of each band stop subunit is configured to control the single complex mixer, and the single band stop filter is coupled to the single complex mixer and configured to suppress a respective interferer within a suppression band containing a fixed suppression frequency, wherein:
a first one of the plurality of band stop subunits is configured to shift, without a shift through DC, the raw complex digital signal from the raw signal frequency band by a difference between a fixed suppression frequency and a first interferer frequency of a first identified continuous wave interferer, by multiplying, in the complex mixer, the raw complex digital signal with a complex exponential signal derived by the associated numerically controlled oscillator from a phase signal corresponding to the first interferer frequency and suppress the suppression band of the band stop filter,
a second one of the band stop subunits is configured to further shift the shifted complex digital signal by a difference between a second interferer frequency and the first interferer frequency by multiplying, in the complex mixer, the shifted complex digital signal with a complex exponential signal derived by the associated numerically controlled oscillator from a difference between a phase signal corresponding to the second interferer frequency and the phase signal corresponding to the first interferer frequency and suppress the suppression band of the band stop unit, and
the band stop unit further includes a further complex mixer configured to shift the further shifted complex digital signal to a fixed filtered frequency band for providing a filtered complex digital signal restricted to the fixed filtered frequency band after suppression of a last identified continuous wave interferer.

20. The GNSS receiver baseband circuit of claim 19, wherein the plurality of band stop subunits includes a third band stop subunit, following the second one of the band stop subunits and preceding the further complex mixer configured to shift the further shifted complex digital signal to the fixed filtered frequency band,
wherein the third band stop subunit is configured to shift in the frequency domain the further shifted complex digital signal based on a difference between a third interferer frequency and the second interferer frequency.

21. The GNSS receiver baseband circuit of claim 19, wherein for each of the plurality of band stop subunits, the respective interferer frequency is identified by the analyzing unit and the respective suppression band, suppressed by the respective band stop subunit, contains the respective fixed suppression frequency corresponding to a shifted interferer frequency associated with the respective band stop subunit.

22. The GNSS receiver baseband circuit of claim 19, wherein the band stop subunits are configured to shift in the frequency domain the digital signal in a same direction.

23. The GNSS receiver baseband circuit of claim 19, wherein the suppression band of each of the band stop subunits is centered at zero frequency.

24. The GNSS receiver baseband circuit of claim 19, wherein the second band stop subunit is configured to further shift the raw digital signal without a shift through DC.

25. The GNSS receiver baseband circuit of claim 19, wherein the single band stop filter included in the first and second band stop subunits further includes:
   a processing unit that calculates, from the shifted digital signal, a mean of a series of values of the shifted digital signal that precede the current value; and
   an adder that subtracts the calculated mean from the current value of the shifted digital signal.

26. The GNSS receiver baseband circuit of claim 19, wherein the suppression band is suppressed such that, at least outside the suppression band, delays of different frequency components of the shifted digital signal do not differ by more than half a sampling interval of the raw digital signal.

27. A GNSS receiver baseband circuit for processing a raw digital signal which is restricted to a fixed raw signal frequency band, comprising:
   an analyzing unit configured to analyze the raw digital signal to identify interferer frequencies within the raw signal frequency band;
   a band stop unit configured to filter the raw digital signal, the band stop unit including a plurality of band stop subunits as separate band stop subunits connected in series, each of the plurality of band stop subunits being configured to suppress a respective interferer identified by the analyzing unit and including:
   a first band stop subunit including:
      a first single numerically controlled oscillator controlled by a first interferer frequency identified by the analyzing unit, and outputting a first complex signal based on the first interferer frequency;
      a first single mixer controlled by the first complex signal output by the first single numerically controlled oscillator and configured to multiply the raw digital signal with the first complex signal and to thereby shift in frequency, without a shift through DC, the raw digital signal from the raw signal frequency band by a difference between a fixed suppression frequency and the first interferer frequency; and
      a first single band stop filter coupled to the first single mixer and configured to suppress a shifted first interferer within a suppression band, wherein the shifted first interferer corresponds to a first respective interferer identified by the analyzing unit; and
   a second band stop subunit including:
      a second single numerically controlled oscillator controlled by a first phase signal corresponding to the first interferer frequency and controlled by a second interferer frequency identified by the analyzing unit, and outputting a second complex signal based on a phase difference between the second interferer frequency and the first interferer frequency;
      a second single mixer controlled by the second complex signal output by the second single numerically controlled oscillator and configured to multiply the shifted raw digital signal with the second complex signal and to thereby further shift in frequency, without a shift through DC, the shifted raw digital signal by a difference between the second interferer frequency and the first interferer frequency; and
      a second single band stop filter coupled to the second single mixer and configured to suppress a shifted second interferer within a suppression band, wherein the shifted second interferer corresponds to a second respective interferer identified by the analyzing unit; and
   a further mixer configured to further shift the further shifted digital signal to a fixed filtered frequency band for providing a filtered digital signal restricted to the filtered frequency band after suppression of a last interferer.

28. The GNSS receiver baseband circuit of claim 27, wherein the first complex signal and the second complex signal are complex exponential signals.

* * * * *